(No Model.)
D. H. RICE.
SHAFT FASTENING DEVICE FOR TRICYCLES.
No. 331,330. Patented Dec. 1, 1885.
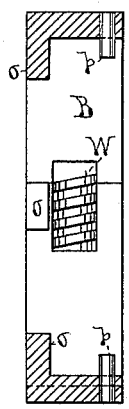
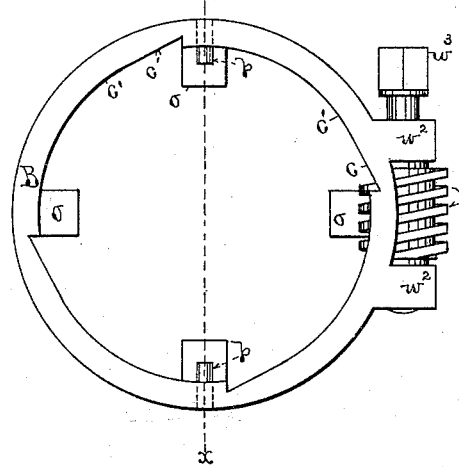
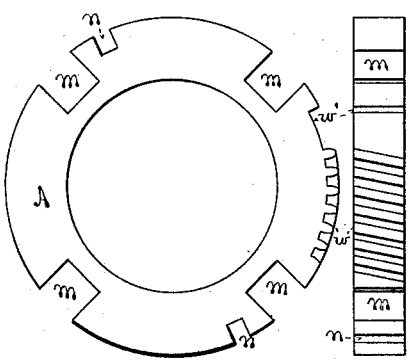
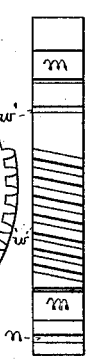
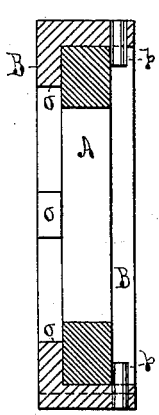
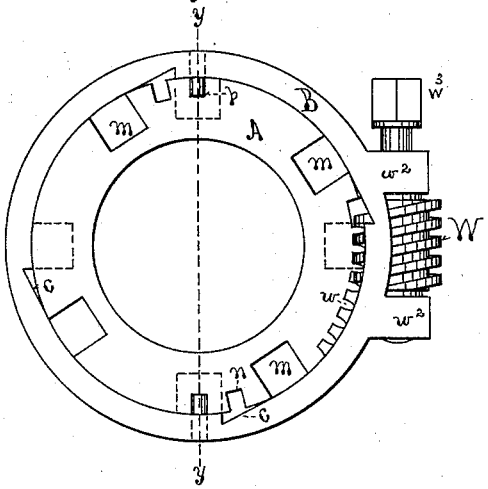
Witnesses
Wm. S. Brown
N. P. Ockington
Inventor
David Hall Rice

UNITED STATES PATENT OFFICE.

DAVID HALL RICE, OF LOWELL, MASSACHUSETTS.

SHAFT-FASTENING DEVICE FOR TRICYCLES.

SPECIFICATION forming part of Letters Patent No. 331,330, dated December 1, 1885.

Application filed September 19, 1885. Serial No. 177,566. (No model.)

*To all whom it may concern:*

Be it known that I, DAVID HALL RICE, of Lowell, in the county of Middlesex and State of Massachusetts, have invented a new and useful Improvement in Shaft-Fastening Devices, of which the following is a specification.

My improvement relates to devices for securing the folding tricycle-shaft in its extensible position, which is shown and described in the Letters Patent of the United States No. 326,245, granted to me September 15, 1885; and it consists in certain novel modifications and combinations of the several parts of the same, substantially as hereinafter described and claimed. In my said Letters Patent I showed an apparatus for securing the several folding members of the extensible vehicle-shaft together in its open position, consisting of an inner ring, (lettered $d^4$,) and containing notches to receive the shaft members, and an outer ring, (lettered E,) slipped over the latter and screwed upon the outside of the inner ring.

My present improvement relates to the method of coupling together said rings in a novel manner to enable it to be quickly and easily performed and cause them to bind the folding-shaft members more rigidly together.

The parts of the vehicle and shaft to which this fastening device is to be applied are clearly shown in said patent, and are well understood, and reference to said patent is hereby had for their combination with the devices herein shown.

In the drawings, Figure 1 is a face view of the inner ring which, holds the members of the shaft internally. Fig. 2 is an edge view of Fig. 1. Fig. 3 is a face view of the outer ring, which is slipped over the shaft members and coupled to the inner one. Fig. 4 is a sectional view of Fig. 3 on the dotted line X X. Fig. 5 is a face view of the outer and inner rings coupled together in position to secure the shaft extended. Fig. 6 is a section of Fig. 5 through the dotted line Y Y.

A is the inner clamping-ring, having notches $m$ $m$ in its outer edge into which the joints of the lazy-tongs forming each shaft member are clamped when unfolded.

On the edge of the ring A, I form a worm-gear, $w$, on one side of which a shallow notch, $w'$, of considerable length, is cut near one of the notches $m$. On opposite sides of the ring A, I cut two other notches, $n$ $n$, through its outer edge.

B is the outer ring, which, instead of being formed with an internal screw-thread, as described in the said patent, is made with its central hole or cavity large enough to just slip over the outside of ring A. The inner edge of ring B has made in it four shallow notches, $c$ $c$, and is beveled off on the same side of each of these notches, as shown at $c'$ $c'$, thus forming cam-shaped surfaces to bind the articulated members of the extensible shaft into the notches $m$ $m$ of the inner ring, as hereinafter described.

On one edge of ring B the studs or stop-pieces $o$ $o$ project inward sufficiently to abut against one face of the inner ring, A, and near the other edge the pins $p$ $p$ are fixed so as to correspond with the notches $n$ $n$ in the inner ring, projecting radially inward a sufficient distance to pass through the notches. The pins $p$ $p$ and studs $o$ $o$ are a sufficient distance apart to allow the thickness of ring A to just pass between them.

On one side of the exterior periphery of ring B, between studs $w^2$ $w^2$ formed on it, is attached the worm W so as to project through a slot cut through the ring, as shown in Fig. 4, inward beyond the inner face of the ring, opposite to the slot $w'$ in ring A, when pins $p$ $p$ register with notches $n$ $n$. The worm W is fixed on the shaft $w^3$, which revolves in bearings in the studs $w^2$ $w^2$, and has one end projecting beyond the studs and squared to receive a wrench or key to revolve it.

The fastening device is used as follows: The ring B is placed over the non-expansible part of the shaft or frame of the vehicle, as described for the corresponding ring in said patent, and the ring A within the same. When the shaft or frame is unfolded and the several lazy-tongs approach each other, the ring B is slipped along over them, so as to bring them into the notches $c$ $c$ and press them inward. At the same time the ring A is placed within them, so as to bring the notches $m$ $m$ opposite to them and the notches $n$ $n$ opposite to pins $p$ $p$ and the notch $w'$ opposite to worm W. As the joints of the lazy-tongs forming the extension are pressed into notches $m$ $m$, the ring B is slipped over ring A, the pins $p$ $p$ passing through notches $n$ $n$ and worm W through notch $w'$ sidewise until the studs $o$ $o$ bear against ring A. Ring B is now turned slightly on ring A and the worm W revolved, bringing them into the position shown in Fig. 5 by the engagement of the worm with worm-gear $w$. This brings the beveled surfaces $c'$ $c'$ of the outer ring to bear upon the joints of the lazy-tongs in notches $m$ $m$, clamping them inward, and by continuing to turn the worm W they may be forced onto these joints with any desired degree of pressure. By reversing the action of the worm notches $c$ $c$ in the outer ring will be brought over notches $m$ $m$ of the inner one, pins $p$ $p$ and worm W opposite to notches $n$ $n$ and $w'$, respectively, and the outer ring may be slipped off of the inner one and along to the non-extensible part of the machine out of the way, and the shaft or frame be folded up, as described in my said patent.

The chief merits of this fastening device are its power and simplicity and the rapidity with which it can be used, as well as lightness and strength.

One pin $p$ and notch $n$ may be employed instead of two, or one stud $o$.

Instead of a worm and gear, a screw or lever may be used to revolve the rings upon one another, or the rings may be revolved by hand; but I prefer the device described.

What I claim as new and of my invention is—

1. The combination of the inner clamping-ring, A, provided with notches $m$ $m$ and one or more notches, $n$, with the outer clamping-ring, B, provided with one or more studs, $o$, and pins $p$, substantially as described.

2. The combination of inner clamping-ring, A, provided with the series of notches $m$ $m$, with the outer clamping-ring, B, provided with the corresponding series of cam-surfaces, $c'$ $c'$, substantially as described.

3. The combination of the inner clamping-ring, A, provided with the series of notches $m$ $m$ and one or more notches, $n$, with the outer clamping-ring provided with one or more studs, $o$, and pins $p$, and the corresponding series of cam-surfaces, $c'$ $c'$, substantially as described.

4. The combination of the inner clamping-ring, A, provided with the series of notches $m$ $m$, with the outer clamping-ring, B, provided with the corresponding series of cam-surfaces, $c'$ $c'$, and mechanism adapted to revolve the one ring around the other, substantially as described.

5. The combination of the inner clamping-ring, A, provided with the series of notches $m$ $m$, and the worm-gear $w$, with the outer clamping-ring, B, provided with the corresponding series of cam-surfaces, $c'$ $c'$, and the worm W, substantially as described.

6. The combination of the inner clamping-ring provided with the series of notches $m$ $m$, one or more notches, $n$, and the worm-gear $w$, with the outer clamping-ring provided with the corresponding cam-surfaces, $c'$ $c'$, one or more studs, $o$, and pins $p$, and the worm W, substantially as described.

DAVID HALL RICE.

Witnesses:
WILLIAM P. BLAKE,
N. P. OCKINGTON.